United States Patent

[11] 3,603,678

| [72] | Inventors | Peter Anderl<br>Munich;<br>Johann Roth, Schwabhausen; Theodor Steibl, Maisach, all of, Germany |
|---|---|---|
| [21] | Appl. No. | 790,663 |
| [22] | Filed | Jan. 13, 1969 |
| [45] | Patented | Sept. 7, 1971 |
| [73] | Assignee | Niezoldi and Kramer GmbH<br>Munich, Germany |
| [32] | Priority | Jan. 13, 1968 |
| [33] | | Germany |
| [31] | | P 16 22 233.6 |

[54] MOTION-PICTURE CAMERA
33 Claims, 5 Drawing Figs.

[52] U.S. Cl. .................................................. 352/169, 352/177
[51] Int. Cl. .................................................. G03b 21/38
[50] Field of Search .......................................... 352/169, 180, 181, 137, 174, 175, 176, 178, 199, 172

[56]           References Cited
              UNITED STATES PATENTS

| 3,079,836 | 3/1963 | Schaefer .................. | 352/169 |
| 3,209,368 | 9/1965 | Misawa ..................... | 352/169 |
| 3,238,008 | 3/1966 | Krumbein ................... | 352/169 |
| FOREIGN PATENTS | | | |
| 595,139 | 11/1947 | Great Britain ............... | 352/199 |
| 1,124,808 | 5/1960 | Germany ..................... | 352/172 |

Primary Examiner—Louis R. Prince
Assistant Examiner—Denis E. Corr
Attorney—Michael S. Striker ABSTRACT: A motion-picture camera which can make a succession of exposures or individual exposures at variable intervals. The drive for the shutter and film-transporting mechanism is blocked in a predetermined position when the trigger is released, and the drive is unblocked by an electromagnet which is energized for a single short period, for a succession of short periods at variable intervals, or continuously in response to depression of the trigger. An electronic, or partly electronic and partly electromechanical, regulator which is built into the camera body controls energization of the electromagnet, at least when the camera is set to make individual exposures.

3,603,678

MOTION-PICTURE CAMERA

BACKGROUND OF THE INVENTION

The present invention relates to motion-picture cameras in general, and more particularly to improvements in multiple-purpose motion-picture cameras. Still more particularly, the invention relates to improvements in motion-picture cameras which can be set to perform several types of operations, especially to make a succession of exposures at predetermined intervals, to make individual exposures, and to make individual exposures at variable intervals.

Presently known motion-picture cameras which are designed to make individual exposures or a succession of exposures at predetermined intervals are rather bulky, complicated, prone to malfunction and expensive. As a rule, such cameras are equipped with a transmission for mechanical shifting from an operation in the course of which the camera makes a series of exposures as long as the trigger remains depressed to an operation in the course of which the camera makes a single exposure in response to each depression of the trigger, regardless of length of the interval during which the trigger dwells in depressed position. If a conventional motion-picture camera is to be capable of making individual exposures at desired (i.e., variable) intervals, it must be equipped with an attachment which is secured to the camera body and cooperates with the mechanism which causes the camera to make individual exposures. The attachment contributes to the weight and bulk of the camera and must be stored in a separate case. As a rule, such attachments are used exclusively by professional photographers.

SUMMARY OF THE INVENTION

An object of our invention is to provide a simple, compact, relatively inexpensive and versatile camera which can be set to perform a variety of operations, particularly the aforementioned three operations (successive exposures at predetermined intervals, individual exposures, and individual exposures at variable intervals) without necessitating the provision of an external attachment.

Another object of the invention is to provide a motion-picture camera of the just outlined character which is simple and inexpensive enough for mass production and for use by professionals as well as by advanced or inexperienced amateur photographers.

A further object of the invention is to provide a motion-picture camera which can be rapidly and readily converted for one of several different operations and wherein such conversion requires little effort.

Still another object of the invention is to provide a motion-picture camera wherein a single trigger suffices to initiate making a succession of exposures at predetermined intervals, individual exposures or individual exposures at variable intervals.

Another object of the invention is to provide a novel drive for a camera of the above outlined character and to provide the camera with a novel electric circuit for the prime mover which drives the shutter and the film-transporting mechanism.

An ancillary object of the invention is to provide a motion-picture camera with a built-in regulating device which enables the camera to make individual exposures at desired intervals and without any attention on the part of the operator.

The improved motion-picture camera comprises a rotary shutter, a drive which rotates the shutter and operates the film-transporting mechanism and includes an electric motor, blocking means preferably including a two-armed lever which is movable between blocking and unblocking positions to respectively prevent and permit operation of the drive, electromagnet means energizable to move the blocking means to unblocking position and to complete the motor circuit, release means including selector means movable between a first position in which the drive is set for continuous operation so that the shutter admits scene light to motion-picture film at predetermined intervals and at least one additional position in which the drive is set for intermittent operations so that the shutter admits scene light for an individual exposure in response to each operation of the drive, and trigger means movable from inoperative to operative position to thereby effect energization of the electromagnet means by way of the release means. The selector means is preferably movable between two additional positions in the first of which the drive performs a single operation in response to movement of the trigger means to operative position and in the second of which the drive performs a succession of operations at variable intervals in response to movement and retention of the trigger means in operative position.

The release means of the camera preferably further comprises a master switch in circuit with the electromagnet means and arranged to close in response to movement of trigger means to operative position. In accordance with one presently preferred embodiment of our invention, the selector means comprises a second switch which is in series with the master switch and is closed in the first position of the selector means so that the electromagnet means is energized in direct response to movement of the trigger means to operative position and remains energized while the trigger means dwells in operative position.

A feature of our invention resides in the provision of a regulator which forms part of the aforementioned release means and is arranged to temporarily energize the electromagnet means in operative position of the trigger means and in each additional position of the selector means. It is also within the purview of our invention to design the regulator in such a way that it is in circuit with the electromagnet means in each position of the selector means, i.e., that the electromagnet means is energized by the regulator not only in each additional position but also in the first position of the selector means.

The regulator preferably comprises an electronic pulse shaper which is operative to effect a single energization of the electromagnet means in the first additional position of the selector means and an adjustable electronic or electromechanical timer for operating the pulse shaper at selected (variable) intervals in the second additional position of the selector means and in operative position of the trigger means. When the selector means assumes the first additional position, movement of the trigger means to operative position results in making of a single exposure irrespective of the length of interval during which the trigger means remains in operative position. When the trigger means is moved to operative position while the selector means assumes its second additional position, the timer sends to the pulse shaper signals at intervals which are selected by the user of the camera whereby the pulse shaper effects short-lasting energization of electromagnet means in response to each such signal. The pulse shaper preferably comprises an unstable multivibrator and the means for varying frequency of signals produced by the timer may comprise a variable resistor which is manipulated by the user of the camera. The entire release means can be built into the body of the motion-picture camera.

The novel features which are considered as characteristic of the invention are set forth in particular in the appended claims. The improved motion-picture camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
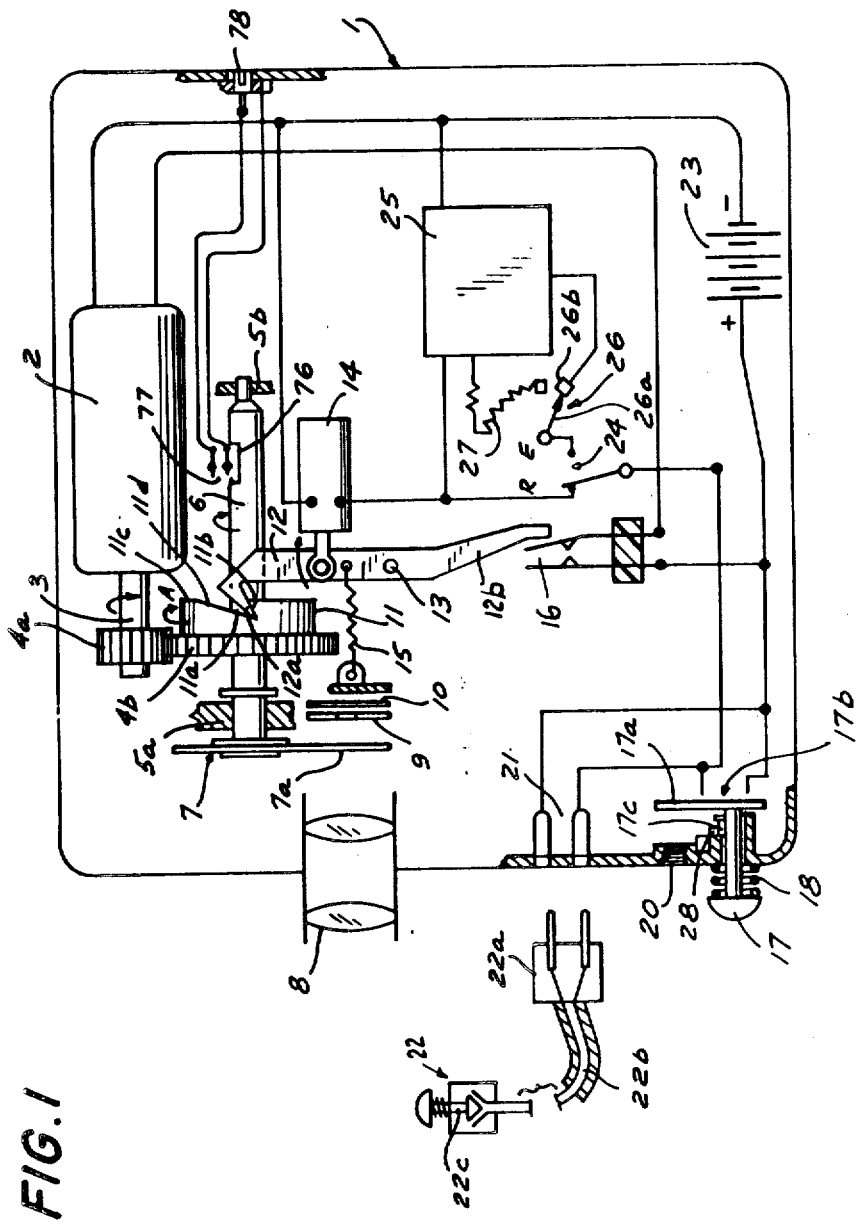
FIG. 1 is a schematic longitudinal vertical sectional view of a motion-picture camera which embodies one form of the invention.

The motion-picture camera of FIG. 1 comprises a housing or body 1 which accommodates a drive including an electric motor 2 having an output shaft 3 which rotates a reducing gearing including a smaller gear 4a and a larger gear 4b. The gear 4a is mounted on the shaft 3 and the gear 4b rotates a main drive shaft 6 which is mounted in bearings 5a, 5b of the housing 1. The main drive shaft 6 carries a rotary shutter 7 having a blade 7a provided with a cutout which permits passage of scene light once during each of its revolutions. Such light enters by way of the objective lens system 8 which is mounted in the front wall of the housing 1 and the light then passes through a gate 9 located in front of motion-picture film 10. The drive including the parts 2-6 also operates a customary film-transporting mechanism (not shown) whose claw pulldown transports the film intermittently past the gate 9 in a well-known manner. The film-transporting mechanism is operated by a cam (not shown) which is mounted on the main drive shaft 6. The shutter blade 7a overlies the window of the gate 9 whenever the pulldown advances the film.

The main drive shaft 6 further rotates a locating wheel 11 which is rigid and coaxial with the gear 4b. The locating wheel 11 cooperates with a blocking element here shown as a lever 12 which is rockable on a pivot pin 13 mounted in the housing 1. The upper arm of the blocking lever 12 is coupled to a movable part of an electromagnet 14. It can be said that the lever 12 constitutes a pivotable armature of this electromagnet. A spring 15 operates between the upper arm of the blocking lever 12 and the housing 1 to bias this lever in a counterclockwise direction, as viewed in FIG. 1, toward the illustrated blocking position. The spring 15 urges a hooked projection or blocking portion 12a at the free end of the upper arm of the lever 12 against the adjoining end face 11c of the locating wheel 11. When the motor 2 is idle, the projection 12a extends into a cutout or notch 11a of the wheel 11 and engages as inclined flank 11b of the wheel to thereby prevent rotation of the shaft 6 in either direction. The lower arm 12b of the blocking lever 12 serves as a trip for a control switch 16 which forms part of a release means and is installed in the circuit of the motor 2. In the illustrated idle position of the drive 2-6, the control switch 16 is open because the spring 15 maintains the projection 12a in engagement with the flank 11b in the notch 11a of the locating wheel 11. Thus, the motor circuit is open whenever the camera is not in use and the locating wheel 11 then ensures that the main drive shaft 6 is maintained in a predetermined angular position, namely, in a position in which the shutter blade 7a overlies the window of the film gate 9 to prevent scene light from reaching the film 10.

If the camera is to make a series of successive exposures, the user depresses a trigger here shown as a knob 17 which is reciprocably mounted in the front wall of the housing 1 and is biased to inoperative position by a helical spring 18. The trigger 17 thereby assumes its operative position and holds the movable contact 17a of a master switch 17b against two stationary contacts to close the master switch and to complete the motor circuit subsequent to energization of the electromagnet 14 which then causes the arm 12b of the blocking lever 12 to close the control switch 16. This is the unblocking position of the lever 12. The trigger 17 can be depressed to operative position by a Bowden wire (not shown) or an analogous remotely controlled mechanical auxiliary trigger one end of which is screwed into a threaded socket 20 in the front wall of the housing 1. The core of the Bowden wire can push the movable contact 17a in a direction to the right, as viewed in FIG. 1, to thereby close the master switch 17b. This switch forms a second part of the aforementioned release means. The front wall of the housing 1 is further provided with a second socket 21 which can receive the plug 22a of a second remotely controlled auxiliary trigger 22. The socket 21 is connected in parallel with the master switch 17b and permits energization of the electromagnet 14 by way of the auxiliary trigger 22. The latter comprises a cable 22b with two conductors and a trigger switch 22c which can be closed by hand. The cable 22b is preferably long so that the camera can be actuated at a desired distance from the housing 1. This electrical remotely controlled trigger 22 preferably replaces the aforementioned conventional mechanical trigger (Bowden wire). Therefore, the threaded socket 20 is available for connection of a customary mechanical timer which can complete the motor circuit with a predetermined delay.

The camera further comprises a selector switch 24 which can assume three different positions in one of which the camera is set to make a succession of exposures at predetermined intervals (position R), in another of which the camera is set to make individual exposures (position E) and in the third of which the camera is set to make individual exposures at desired (variable) intervals. It is assumed that the selector switch 24 is in the position R so that the camera is set to make a succession of exposure at predetermined intervals and that the operator has depressed the trigger 17 so that the master switch 17b is closed. The circuit of the winding of electromagnet 14 is then completed from the positive pole of a battery 23 or another suitable energy source in the housing 1, through the closed master switch 17b, selector switch 24 and to the negative pole of the battery 23. The thus-energized electromagnet 14 pivots the blocking lever 12 in a clockwise direction to stress the spring 15 and to disengage the projection 12a from the flank 11b of the locating wheel 11. At the same time, the lower arm 12b of the blocking lever 12 closes the control switch 16 which completes the motor circuit from the positive pole of the battery 23, through the closed control switch 16, winding of the motor 2, and to the negative pole of the battery. The motor 2 starts to rotate the main drive shaft 6 which rotates the shutter 7 and simultaneously operates the film-transporting mechanism. The direction of rotation of the main drive shaft 6 is indicated by the arrow. The camera remains in operation as long as the user continues to depress the trigger 17. When the trigger 17 is released, the master switch 17b opens due to action of the return spring 18 and the electromagnet 14 is deenergized to permit the spring 15 to pivot the blocking lever 12 in a counterclockwise direction in order to open the control switch 16, i.e., to open the circuit of the motor 2. However, such pivotal movement of the blocking lever 12 to blocking position is possible only when the projection 12a registers with the notch 11a, i.e., the motor 2 continues to rotate the main drive shaft 6 and wheel 11 while the control switch 16 remains closed and while the tip of the projection 12a slides along the adjoining end face 11c of the wheel 11. The motor 2 comes to a halt when the projection 12a enters the notch 11a and engages the flank 11b, i.e., the arm 12b then permits the control switch 16 to open and to deenergize the motor circuit. As explained above, the shutter blade 7a overlies the window of the film gate 9 when the projection 12a engages the flank 11b so that scene light cannot reach the film 10 when the motor 2 is idle. Uncontrolled angular displacement of the main drive shaft 6 from the illustrated idle position is prevented by a relatively long slanting guide face 11d of the wheel 11 which guides the tip of the projection 12a into the deepmost zone of the notch 11a so that the projection 12a then engages and remains in engagement with the flank 11b.

The just described construction of the improved camera ensures that the main drive shaft 6 invariably assumes a predetermined angular position when the motor 2 is idle, i.e., a position in which the shutter blade 7a overlies the window of the film gate 9. If the user thereupon decides to make individual exposures, the selector switch 24 is moved by hand to the position E. This selector switch is mounted on or is accessible at one sidewall of the housing 1 and it constitutes a further element of the aforementioned release means. The trigger 17 is thereupon depressed to close the master switch 17b and to thereby connect the battery 23 with an electric regulator 25 which includes a timer operatively connected with a pulse shaper. The circuit is completed from the positive pole of the battery 23, through the closed master switch 17b, selector switch 24 (in position E), movable contact or slider 26a of a variable resistor 26, stationary terminal 26b of the regulator 25, and to the minus pole of the battery 23. The slider 26a is placed into engagement with the terminal 26b prior to depression of the trigger 17. The regulator 25 can include electronic and/or electromechanical components; its operation will be described in detail in connection with FIG. 2. This regulator produces a short-lasting signal which is transmitted to the electromagnet 14 so that the latter is energized and disengages the projection 12a of the blocking lever 12 from the locating wheel 11. The lever 12 closes the control switch 16 so that the motor 2 is started and rotates the main drive shaft 6 through one complete revolution despite the fact that the electromagnet 14 is deenergized immediately. This is due to the aforedescribed design of the locating wheel 11 which prevents the projection 12a from reentering the notch 11a before the main drive shaft 6 completes a full revolution. Once the projection 12a reenters the notch 11a, the arm 12b permits the control switch 16 to open and the circuit of the motor 2 is deenergized. This takes place even if the user continues to depress the trigger 17. A second exposure is made in the just-described manner if the user releases the trigger 17 and depresses it again to cause short-lasting energization of the electromagnet 14 by way of the regulator 25. The regulator 25 constitutes still another element of the release means.

If the user thereupon decides to make a series of individual exposures at desired (variable) intervals, the slider 26a of the resistor 26 is placed into engagement with a selected portion of the wire 27 which is electrically connected with a second input of the regulator 25. The camera is then set for making individual exposures at desired (variable) intervals. If the trigger 17 is depressed, the circuit of the electromagnet 14 is completed periodically by the regulator 25. This regulator produces output signals of predetermined duration and at desired intervals as long as the trigger 17 remains depressed. The length of intervals between successive output signals can be varied by changing the position of the slider 26a with reference to the wire 27. The slider 26a is accessible at the outer side of the camera body 1. The duration of signals produced by the regulator 25 is selected in such a way that the electromagnet 14 is energized for a period of time which is a small fraction of the time required by the main drive shaft 6 to complete a revolution. Thus, the projection 12a of the blocking lever 12 invariably enters the notch 11a of the locating wheel 11 upon completion of each of a series of individual exposures which are produced at intervals determined by the position of the slider 26a. It will be seen that the camera can make a succession of exposures at predetermined intervals (in the position R of the selector switch 24), individual exposures (one at a time) when the selector switch 24 is moved to the position E, and a succession of individual exposures at desired (variable) intervals when the slider 26a of the variable resistor 26 engages the wire 27. When the camera is set to make individual exposures at variable intervals, the drive is brought to a standstill upon completion of each exposure. Thus, the motor 2 need not be running when the camera is not making an exposure and the customary clutch between the motor and the main drive shaft can be dispensed with. Such clutches are subjected to considerable wear and the provision of such clutches results in consumption of greater amounts of energy because the camera must employ a larger motor which is capable of driving one element of the clutch with reference to the other element when the motor is in operation but the main drive shaft is held against rotation.

When the slider 26a engages the wire 27, the regulator 25 produces signals at desired intervals, as long as the user continues to maintain the trigger 17 in operative position. If the camera is to be operated in the just described manner for longer periods of time, for example, for 1 or more hours, the trigger 17 is preferably locked in operative position. This can be achieved by the provision of a simple locking device including a first locking member 17c on the stem of the trigger 17 and a complementary second locking member 28 on the front wall of the housing 1. The locking member 28 is engaged by or disengaged from the locking member 17c in response to rotation of the trigger 17 in operative position. These locking members are preferably designed in such a way that they can yieldably hold the trigger 17 in operative position under the action of the spring 18. For example, such yieldable holding means may include a detent structure having a projection on the locking member 17c and a complementary socket or recess on the locking member 28 (or vice versa) whereby the projection enters the socket when the trigger 17 is fully depressed and rotated about its axis in one direction. If the trigger is thereupon released, the spring 18 tends to expand and prevents unintentional removal of the projection from its socket. This prevents unintentional movement of the trigger 17 to inoperative position in response to vibrations or similar shocks. In order to arrest the camera, the operator simply pushes the trigger 17 to fully depressed position and rotates the trigger to disengage the locking member 17c from the locking member 28 in order to permit automatic expansion of the spring 18 as soon as the trigger is released. Slider 26a, regulator 25 wire 27 and selector 24 comprise control means.

Figure 2:
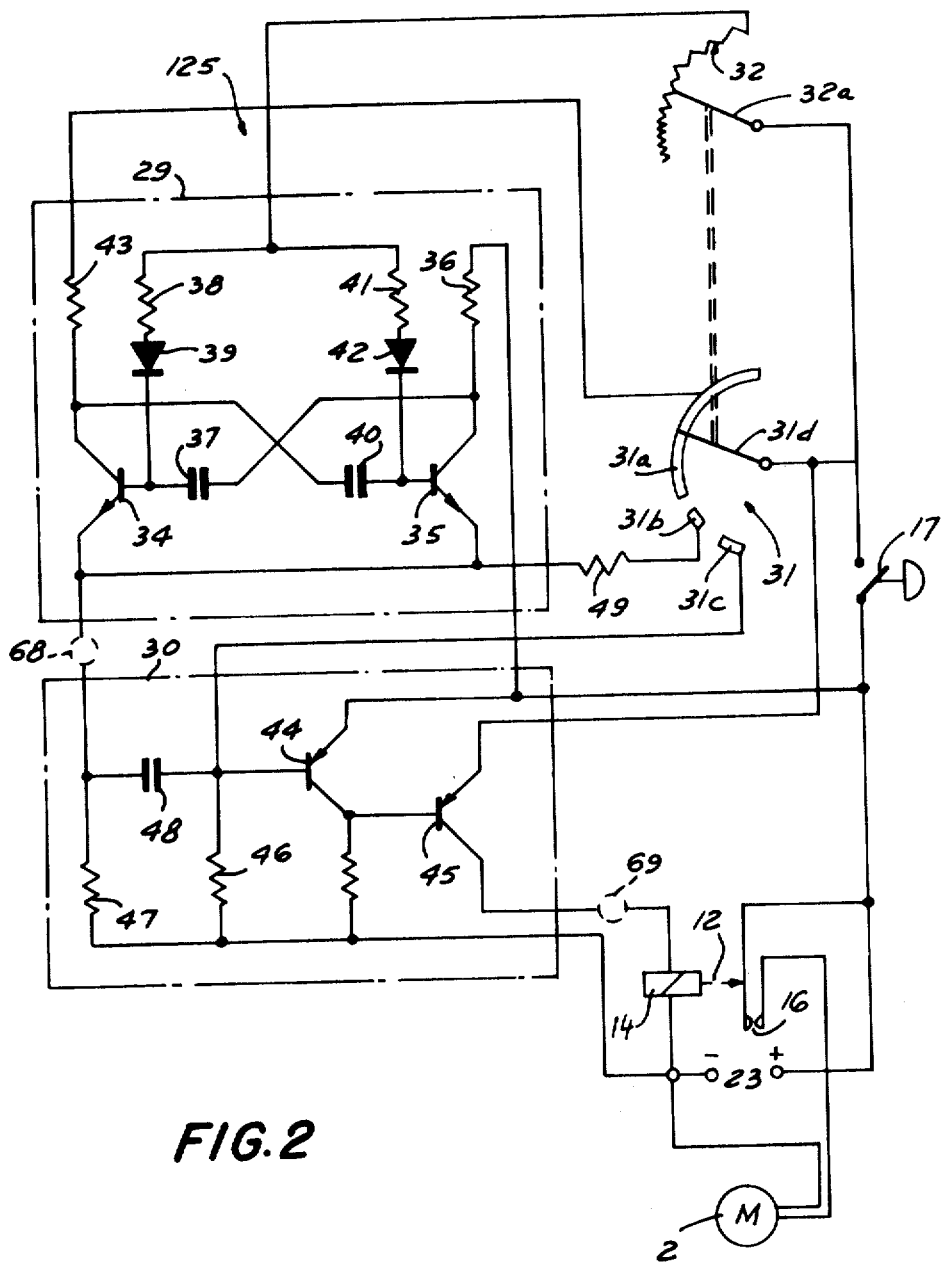
FIG. 2 is a diagram showing the electric circuit of a modified regulator which can be utilized in the camera of FIG. 1.

One presently preferred regulator 125 is illustrated in FIG. 2. At this time, we prefer to employ regulators which include electronic or mechanical timers and electronic pulse shapers. The regulator 125 of FIG. 2 comprise an electronic timer 29 and an electronic pulse shaper 30. The timer 29 is an unstable multivibrator. A selector switch 31 is settable by hand to one of three positions in which the camera is respectively set for making a series of successive exposures at predetermined intervals, individual exposures, and individual exposures at desired (variable) intervals. The regulator 125 further comprises a variable resistor 32 for selection of signal frequency at infinitely variable intervals. The slider 32a of the variable resistor 32 is operatively connected with the movable selector arm 31d of the selector switch 31. The latter has three stationary contacts 31a, 31b, 31c extending along an arc so that each thereof can be engaged by the tip of the movable arm 31d. The trigger 17 is shown schematically to the right of the selector switch 31.

When the camera is set to make individual exposures at variable intervals, the movable arm 31d of the selector switch 31 engages the fixed contact 31a. The timer 29 receives current from the battery 23 by way of the variable resistor 32 and selector switch 31 in response to depression of the trigger 17 (i.e., in response to closing of the master switch 17b). The timer 29 comprises a first transistor 34 which is connected with the battery 23 by way of the selector switch 31 and trigger 17 (master switch 17b) and a second transistor 35 which is connected with the battery 23 without interposition of switches. Thus, when the trigger 17 is not depressed, the base potential of the transistor 35 is determined by a voltage divider in such a way that the transistor 35 conducts current. The voltage divider includes the diode resistors of the emitter-collector circuit of the transistor 35. When the trigger 17 is depressed, the collector potential of the transistor 35 is less than the potential of the battery 23. This is due to the presence of a resistor 36. Depression of the trigger 17 results in connection of the battery 23 with a capacitor 37. The voltage at the plates of the capacitor 37 causes the flow of a charging current through a resistor 38, a diode 39, capacitor 37 and the collector-emitter circuit of the transistor 35. The base potential of the transistor 34 decreases proportionally with current flow due to the action of the resistor 38; therefore, the transistor 34 is then nonconductive. As the charge of the capacitor 37 increases, the flow of charging current decreases and the base potential of the transistor 34 becomes more positive. When the capacitor 37 is fully charged, the flow of charging current is interrupted and the transistor 34 becomes conductive. At such time, the potential at the emitter of the transistor 34 equals the potential at the collector and the potential difference between the plates of a capacitor 40 causes the flow of a charging current through a resistor 41, a diode 42, capacitor 40 and the collector-emitter circuit of the transistor 34. The base potential of the transistor 35 drops and the latter ceases to conduct current. The capacitor 37 discharges by way of the resistor 36, the base-collector circuit of the transistor 34 and a resistor 43. The capacitor 40 discharges through the resistor 43, the base-collector circuit of the transistor 35 and resistor 36.

In order to properly time the opening of the shutter 7, the duration of energization of electromagnet 14 must be selected with a high degree of accuracy. Therefore, signals produced by the timer 29 at desired intervals (determined by the position of the slider 32a) are transmitted first to the pulse shaper 30 which thereupon transmits signals to the electromagnet 14, i.e., it completes the electromagnet circuit for predetermined intervals of time in response to reception of signals from the timer 29. It is to be borne in mind that, when the camera is set to make individual exposures at variable intervals, the length of intervals can be very short or very long. The pulse shaper 30 is an electronic switch which comprises two similar transistors 44 and 45. If the transistors 44, 45 are of the PNP type, the emitter of the transistor 44 is directly connected with the positive pole of the battery 23 and the emitter of the transistor 45 is connected with the positive pole by way of the trigger 17 (master switch 17b). The collector of the transistor 44 is then connected with the base of the transistor 45. The transistors 44, 45 of FIG. 2 are of the PNP type.

The transistor 44 is permanently connected with the battery 23 and conducts current in idle condition of the pulse shaper 30 because of base-emitter potential. The working point of the transistor 44 is determined by a resistor 46 in such a way that, when the ratio of collector resistances of transistors 34, 35 in the timer 29 is five to one, the variation of potential at the terminals of a resistor 47 is high enough to ensure that a positive-switching impulse developing by differentiation at the resistor 47 and a capacitor 48 blocks the transistor 44 if such impulse is caused by the transistor 35. If the impulse is caused by the transistor 34, the transistor 44 continues to conduct current. When the transistor 44 conducts current, the base of the transistor 45 is positive to such an extent that the transistor 45 does not conduct current in idle position.

A signal produced by the transistor 35 of the timer 29 raises the base potential of the transistor 44 by way of the capacitor 48, i.e., the base potential of the transistor 44 is sufficiently positive to ensure that the transistor 44 blocks. This results in generation of a large negative base-emitter potential at the transistor 45 so that the latter conducts current.

Since the collector of the transistor 45 is directly connected with the electromagnet 14, full current flows from the positive pole of the battery 23, through the collector-emitter circuit of the transistor 45, winding of the electromagnet 14 and to the negative pole of the battery. The electromagnet 14 is energized and disengages the blocking lever 12 from the locating wheel 11 so that the main drive shaft 6 is free to rotate and is driven by the motor 2 in response to closing of the control switch 16 by the arm 12b of the blocking lever.

The charge of the capacitor 48 is equalized through resistors 46 and 47 until the transistor 44 begins to conduct current. The capacitor 48 and the resistors 46, 47 determine the shortest intervals between successive signals from the pulse shaper 30.

When the camera is to make individual exposures, the operator moves the arm 31d of the selector switch 31 into engagement with the fixed contact 31b. This interrupts the flow of current to the timer 29 but the transistor 35 conducts current for reasons which were explained above. The exposures are made in response to successive depressions of the trigger 17 which includes master switch 17b (not shown in FIG. 2).

The lead which connects the contact 31b with the pulse shaper 30 contains a resistor 49 which is in parallel with the resistor 36 when the trigger 17 is depressed to close the master switch 17b. The resistor 49 is dimensioned in such a way that, when the master switch 17b is closed, the transistor 44 blocks the flow of current due to a change of potential at the terminals of the resistor 47 for a period of time which is required to charge the capacitor 48 (due to potential difference between the terminals of the resistor 47). This causes the transistor 44 to conduct current as long as the operator continues to depress the trigger 17. Only one exposure can be made in response to depression of the trigger 17, regardless of the length of the interval during which the trigger remains in operative position.

In order to make a succession of exposures at predetermined intervals, the user moves the arm 31d of the selector switch 31 into engagement with the fixed contact 31c. Thus, the timer 29 remains disconnected. When the trigger 17 is depressed to close the master switch 17b, the potential at the base of the transistor 44 immediately rises to a maximum value so that the transistor 44 blocks the flow of current. Therefore, the transistor 45 is conductive and the circuit of the motor 2 is completed by the energized electromagnet 14 which causes the blocking lever 12 to release the locating wheel 11 and to close the control switch 16.

One of the main differences between the regulators 25 and 125 is that the regulator 25 is used only when the camera of FIG. 1 is to make individual exposures at desired intervals or when the camera of FIG. 1 is to make individual exposures. The regulator 125 is used for all three settings of the camera which embodies the structure of FIG. 2. Timer 29, shaper 30 and selector switch 31 comprise control means.

Figure 3:
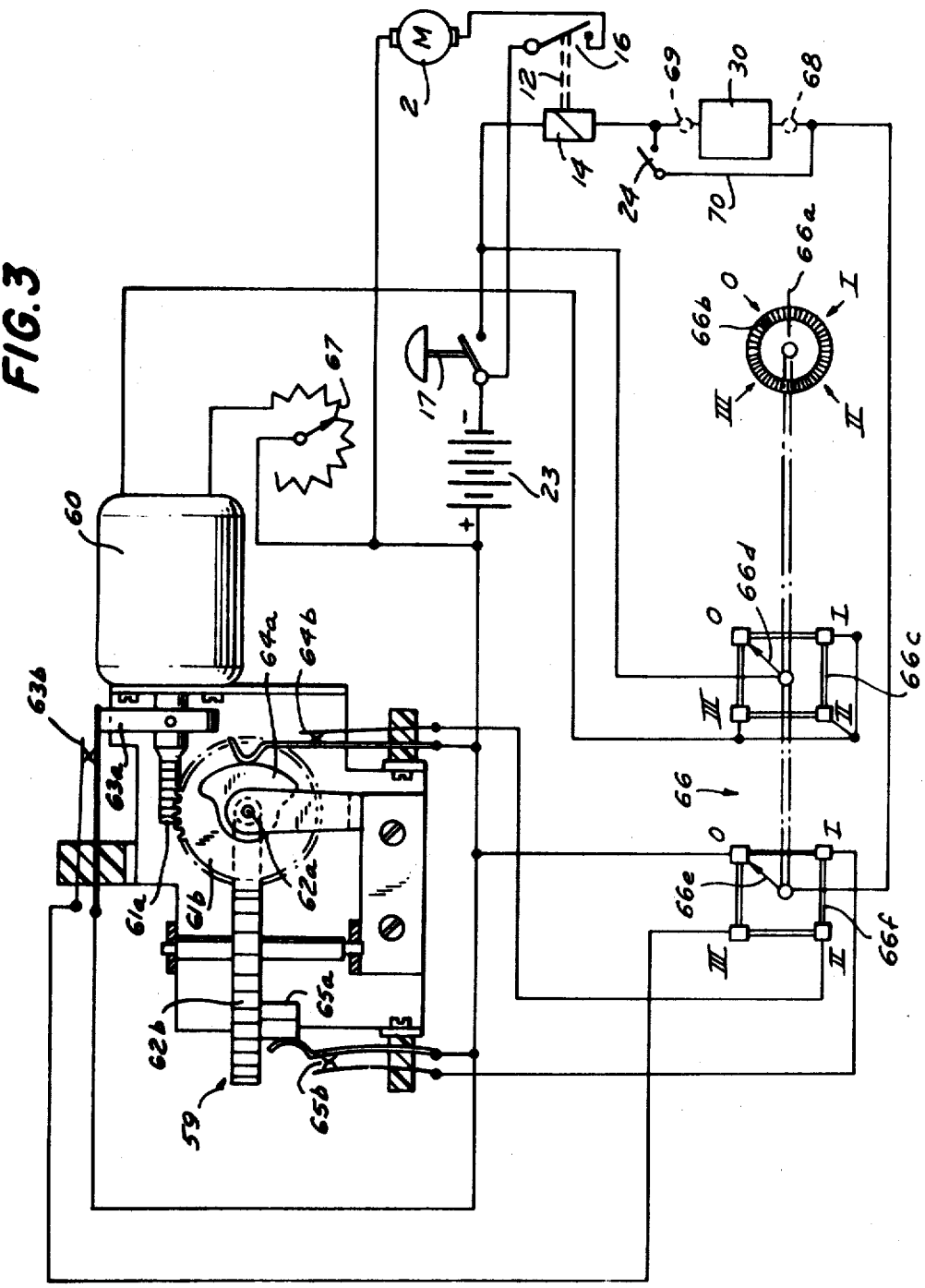
FIG. 3 is a schematic sectional view of a third camera which comprises a third regulator.

FIG. 3 illustrates a third camera wherein the regulator comprises an electronic pulse shaper 30 which is identical with that of FIG. 2 and an electromechanical timer 59 which replaces the timer 29. The timer 59 comprises an electric motor 60 which drives a first transmission including a worm 61a and a worm wheel 61b. The shaft of the worm 61a carries a first actuating member here shown as a disk cam 63a which can actuate a first switch 63b. The worm wheel 61b rotates a second actuating member or disk cam 64a for a second switch 64b. The shaft 62a of the worm wheel 61b is a worm shaft and forms part of a second transmission which includes a worm wheel 62b carrying a third actuating member or disk cam 65a for a third switch 65b. The shaft of the worm wheel 62b is journaled in bearings provided in the housing of the camera. The disk cams 63a, 64a and 65a rotate at different speeds and each thereof closes the corresponding switch 63b, 64b, 65b once during each revolution. Closing of these switches results in generation of signals which are transmitted to the pulse shaper 30 at different intervals in dependency on the setting of a main selector switch 66. The length of such intervals can be varied further by a variable resistor 67 which is in circuit with and can change the speed of the motor 60. Timer 59, shaper 30 selector 66 and resistor 67 comprise control means.

The main selector switch 66 has a milled or knurled rotary knob 66a which is movable from a zero position 0 to the position I, II or III. Each such position is indicated by an index or marked 66b which is provided on the rotary knob 66a and can be placed into registry with graduations 0, I, II, III on a scale of the camera housing. It is now assumed that the user has decided to move the index 66b from registry with the graduation 0 into registry with the graduation I. The user thereupon depresses the trigger 17 to close the master switch 17b (not shown in FIG. 3) whereby the main selector switch 66 completes the circuit of the motor 60 in the timer 59. The current flows from the positive pole of the battery 23, through the variable resistor 67, winding of the motor 60, fixed contact I on the platform 66c of the selector switch 66, a first movable contact 66d of the selector switch 66, master switch 17b (trigger 17) and to the negative pole of the battery 23. The motor 60 rotates directly the cam 63a on the shaft of the worm 61a (the shaft of the worm 61a is the output shaft of the motor 60), and this motor also rotates the cams 64a, 65a through the intermediary of transmissions 61a, 61b and 62a, 62b. Rotation of the cam 64a is slower than that of the cam 63a but faster than that of the cam 65a. In the position I of the knob 66a, the switch 65b of the timer 59 is effective and completes the circuit of the pulse shaper 30 from the positive pole of the battery 23, through the closed switch 65b, contact I on the second platform 66f of the selector switch 66, a second movable contact 66e of the selector switch 66, a first terminal 68 of the pulse shaper 30, pulse shaper 30, a second terminal 69 of the pulse shaper, winding of the electromagnet 14, master switch 17b (trigger 17), and to the negative pole of the battery 23. The terminals 68, 69 of the pulse shaper 30 are shown in FIG. 2 (by dotted lines).

The energized electromagnet 14 disengages the blocking lever 12 from the locating wheel 11 and causes this lever to close the control switch 16 so that the circuit of the camera motor 2 is completed from the positive pole of the battery 23, through the winding of motor 2, control switch 16, master switch 17b (trigger 17) and to the negative pole of the battery. The pulse shaper 30 immediately deenergizes the electromagnet 14 so that the main drive shaft 6 is arrested by blocking lever 12 when it completes a single revolution. The motor 2 is started again when the cam 65a closes the switch 65b for a second time. The camera continues to make individual exposures at intervals determined by rotational speed of the cam 65a as long as the trigger 17 remains in operative position.

The frequency of signals can be increased by moving the rotary knob 66a of the main selector switch 66 to the position II. The selector switch 66 then connects the switch 64b (actuated by the cam 64a) in circuit with the electromagnet 14. The flow of current is from the positive pole of the battery 23, through the closed switch 64b, contact II on the platform 66f of the selector switch 66, second movable contact 66e, pulse shaper 30, winding of the electromagnet 14, closed master switch 17b (trigger 17) and to the negative pole of the battery 23. A further increase in signal frequency is achieved by moving the knob 66a to the position III. The switch 63b (controlled by the cam 63a) is then in circuit with the electromagnet 14. The flow of current is from the positive pole of the battery 23, through the closed switch 63b, contact III on the platform 66f of the selector switch 66, movable contact 66e, pulse shaper 30, winding of the electromagnet 14, closed master switch 17b (trigger 17) and to the negative pole of the battery. Such increases in signal frequency are due to the fact that the cam 64a is rotated faster than cam 65a but at a speed which is less than the speed of the cam 63a.

If the user wishes to make individual exposures, the index 66b of the knob 66a is moved into registry with the graduation 0. The switches 63b, 64b, 65b are then bypassed and the positive pole of the battery 23 is connected directly with the 0 contact on the platform 66f of the selector switch 66. The flow of current is from the positive pole of the battery, through the contact 0 on the platform 66f and contact 66e of the selector switch 66 (the latter then assumes the position which is shown in FIG. 3), pulse shaper 30, winding of the electromagnet 14, closed master switch 17b (trigger 17) and to the negative pole of the battery. The circuit of the motor 60 is open because the first contact 66d (cooperating with the contacts 0, I, II, III on the platform 66c of the selector switch 66) then engages the contact 0 on the platform 66c. If the user then depresses the trigger 17 to close the master switch 17b, the pulse shaper 30 receives a single signal and limits the period of energization of the electromagnet 14 in such a way that the main drive shaft 6 can complete a single revolution in a manner as described in connection with FIG. 1 (i.e., due to cooperation of projection 12a on the blocking lever 12 with the flank 11b in the notch 11a of the locating wheel 11).

If the user wishes to make a succession of exposures at predetermined intervals, the selector switch 24 is closed while the knob 66a of the main selector switch 66 remains in the position 0. The switch 24 then permits the current to bypass the pulse shaper 30. When the trigger 17 is depressed to close the master switch 17b, the electromagnet 14 is energized and remains energized as long as the operator continues to maintain the trigger 17 in operative position. The flow of current is from the positive pole of the battery 23, through the contact 0 (on the platform 66f of the selector switch 66, movable contact 66e, a conductor 70 which bypasses the terminals 68, 69 of the pulse shaper 30 and contains the closed selector switch 24, winding of the electromagnet 14, closed master switch 17b (trigger 17) and to the negative pole of the battery. The electromagnet 14 disengages the blocking lever 12 from the locating wheel 11 and holds the blocking lever in unblocking position as long as the operator continues to hold the trigger 17 in operative position. The thus disengaged blocking lever 12 closes the control switch 16 and completes the circuit of the motor 2.

It is also within the purview of our invention to replace the electromechanical timer 59 of FIG. 3 with other types of timers. For example, the output shaft of the motor 60 can carry a drum-shaped carrier with several cams, or such carrier can be driven by the motor 60 through the intermediary of a single stepdown transmission. The cams of the carrier cam cooperate with several switches which replace the switches 63b, 64b, 65b of FIG. 3. The cams can be disposed in three circumferentially extending annular rows each of which contains a different number of cams. For example, the first row can contain four cams, the second row eight cams and the third row 16 cams. Thus, depending on the setting of the selector (66 in FIG. 3), the switches which cooperate with the first, second and third rows of cams can produce signals at different frequencies during each revolution of the carrier. Such signals are transmitted to the pulse shaper 30 or to an analogous pulse shaper. The motor which drives the carrier can be rotated at different speeds, for example, in the same way as described in connection with FIG. 3 (variable resistor 67).

Figure 4:
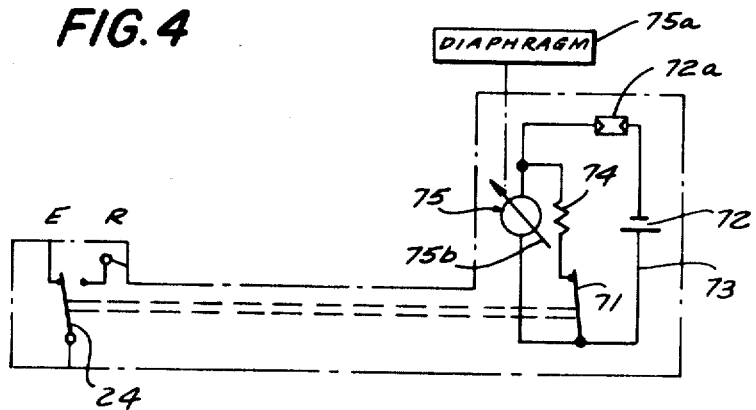
FIG. 4 illustrates a connection between the selector means and the exposure meter of the camera.

The selector switch 24 of FIG. 1 (or the selector switch 31 of FIG. 2) can be mechanically coupled with an interrupter switch 71 which is shown in FIG. 4 in the circuit 73 of the exposure meter in the motion-picture camera. Such circuit further comprises a battery 72 or another suitable energy source, a photosensitive receiver 72a, an electric light meter 75 which can adjust a diaphragm 75a, and a resistor 74 in series with the interrupter switch 71. The resistor 74 is a correcting resistor which is connected in parallel with the light meter 75 to compensate for inertia of the motor 2 when the latter is started while the camera is set to make a single exposure or a succession of individual exposures at variable intervals. The needle 75b of the light meter 75 then adjusts the diaphragm 75a in a sense to reduce the size of the aperture (i.e., in the same way as if the intensity of scene light increases). This ensures that the camera makes satisfactory exposures upon resetting from operation with continuously rotating motor 2 to operation when the camera makes a single exposure or a series of individual exposures at variable intervals.

Figure 5:
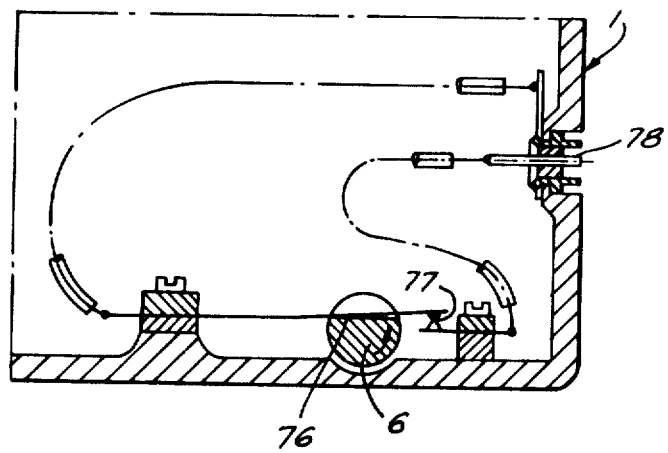
FIG. 5 is a schematic fragmentary sectional view of the camera of FIG. 1, showing a synchronizing switch which is operated by the drive for the shutter to synchronize the operation of the shutter with that of a flash unit.

The main drive shaft 6 of the camera is preferably provided with a flat 76 (see FIGS. 1 and 5) which can open and close a synchronizing switch 77 whose terminals are connected to a socket 78 in the rear wall (or another wall) of the camera housing 1. The socket 78 forms part of a flash circuit and can be connected with the plug of an illuminating device (e.g., an electronic flash unit, not shown) whereby the flash unit produces flashes in synchronism with operation of the camera, i.e., whenever the shutter 7 is open so that the shutter blade 7a permits scene light to reach an unexposed frame of the film 10. The flash unit can be detachably secured to the socket 78 or is built into the housing 1.

It is equally within the purview of our invention to provide the main drive shaft 6 with another flat (corresponding to the flat 76 of FIG. 5) or with an analogous actuating element which can close a further switch (not shown) in an electrically operated frame counter. Such frame counter counts the number of exposed frames (or the number of remaining unexposed film frames) when the camera is set to make individual exposures, a succession of individual exposures at variable intervals or a succession of exposures at predetermined intervals. The frame counter can also include a limit switch or the like in the circuit of the motor 2 to arrest the camera drive upon completion of a predetermined number of exposures (i.e., when the supply of unexposed motion-picture film is exhausted). Such frame counter is of particular advantage when the camera is set to make exposures at varying intervals, i.e., the frame counter can arrest the drive of the camera in a fully automatic way as soon as the supply of unexposed film is exhausted and the operator need not remain at the point where the camera is located. Thus, once the camera is set for making individual exposures at variable intervals, the operator can leave the camera alone and the limit switch of the frame counter automatically opens the circuit of the motor 2 to thus arrest the drive when the supply of unexposed film is exhausted. The frame counter is actuated by the flat of the main drive shaft 6 once during each revolution and when the main drive shaft assumes a predetermined angular position.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

1. In a motion-picture camera, a combination comprising a rotary shutter; a drive, including an electric motor, for rotating said shutter; blocking means movable between blocking and unblocking positions to respectively prevent and permit the operation of said drive; electromagnet means energizable to move said blocking means to said unblocking position and to complete the circuit of said motor; release means including selector means movable between a first position in which said drive is set for continuous operation so that the shutter admits scene light to motion-picture film at predetermined intervals and a plurality of additional positions in each of which said drive is set for intermittent operations so that the shutter admits scene light for an individual exposure in response to each operation of said drive; and trigger means movable from an inoperative to an operative position to thereby effect the energization of said electromagnet means by way of said release means, said drive means performing a single operation is response to movement of said trigger means to said operative position in one of said additional positions of said selector means and said drive performing a succession of operations at variable intervals in response to movement of said trigger means to said operative position in another of said additional positions of said selector means, said release means further comprising regulator means arranged to temporarily energize said electromagnet means in each additional position of said selector means on movement of said trigger means to said operative position.

2. A combination as defined in claim 1, wherein said regulator means comprises pulse shaper means operative to effect a single energization of said electromagnet means in the first additional position of said selector means and adjustable timer means for operating said pulse shaper means at selected intervals in the second additional position of said selector means on movement of said trigger means to operative position.

3. A combination as defined in claim 2, wherein said timer means and said pulse shaper means comprise electronic components.

4. A combination as defined in claim 2, wherein said timer means comprises an unstable multivibrator arranged to produce signals for operation of said pulse shaper means, and means for varying the frequency of such signals.

5. A combination as defined in claim 4, wherein the means for varying the frequency of said signals comprises variable resistor means.

6. A combination as defined in claim 2, wherein said timer means comprises a plurality of switches and said selector means comprises means for connecting selected switches in circuit with said electromagnet means, and driven actuating means for said switches.

7. A combination as defined in claim 6, wherein said actuating means comprises a plurality of cams.

8. A combination as defined in claim 6, wherein said actuating means comprises cam means, one for each of said switches and each arranged to close the respective switch at different intervals.

9. A combination as defined in claim 8, wherein said timer means further comprises a motor arranged to drive said cam means by way of at least one transmission.

10. A combination as defined in claim 9, wherein each of said cam means comprises a disk cam and wherein each of said cams is arranged to rotate at a different speed in response to operation of said last-mentioned motor.

11. A combination as defined in claim 8, wherein said timer means further comprises a motor rotary carrier means driven by said last-mentioned motor, each of said cam means comprising an annulus of cams on said carrier means and the cams of each annulus being located at different distances from each other.

12. A combination as defined in claim 6, wherein said timer means further comprises an electric motor for driving said actuating means and means for varying the speed of said last-mentioned motor.

13. A combination as defined in claim 12, wherein the means for varying the speed of said last-mentioned motor comprises variable resistor means in the circuit of such motor.

14. A combination as defined in claim 2, wherein said pulse shaper means comprises an electronic switch.

15. A combination as defined in claim 2, wherein said selector means comprises a single selector switch movable between three positions which respectively correspond to the first position, to the first additional position and to the second additional position of said selector means, said timer means comprising an electronic timer arranged to produce a succession of signals for operation of said pulse shaper means and variable resistor means adjustable by said selector switch to thereby change the intervals between successive signals produced by said timer.

16. In a motion-picture camera, a combination comprising a rotary shutter; a drive including an electric motor, for rotating said shutter; blocking means movable between blocking and unblocking positions to respectively prevent and permit operation of said drive, said blocking means normally tending to move from said unblocking to said blocking position; electromagnet means energizable to move said blocking means from said blocking position to said unblocking position and to simultaneously and invariably complete the circuit of said motor so that the motor circuit is completed whenever and as long as said electromagnet means is energized; control means for regulating the energization of said electromagnet means for the desired mode of operation of said drive including selector means movable between a first position in which said electromagnet means is set for continuous energization so that the shutter admits scene light to motion-picture film at predetermined intervals and at least one additional position in which said electromagnet means is set for intermittent energizations so that the shutter admits scene light for an individual exposure in response to each instance of intermittent energization of said electromagnet means; and master switch means movable from an inoperative position to an operative position to thereby effect energization of said electromagnet means by way of said control means and to thus effect completion of said motor circuit as a result of energization of said electromagnet means.

17. A combination as defined in claim 16, further comprising a socket for attachment of auxiliary trigger means which is adapted to move said master switch means to said operative position.

18. A combination as defined in claim 16 wherein, said one additional position of said selector means, said drive performs a single operation in response to movement of said master switch means to said operative position, said selector means being movable to another additional position in which said drive performs a succession of operations at variable intervals in response to movement of said master switch means to said operative position.

19. A combination as defined in claim 10, wherein said drive further comprises a main drive member which is rotated by said motor and a locating member provided on said drive member, said blocking means comprising a blocking element which engages said locating member in deenergized condition of said electromagnet means to thereby hold said drive member in a predetermined angular position.

20. A combination as defined in claim 19, wherein said blocking element is a lever having an arm provided with a projection which enters a notch provided on said locating member in response to deenergization of said electromagnet means to thereby hold said driving member in said predetermined angular position.

21. A combination as defined in claim 16, further comprising synchronizing switch means movable to closed position in response to movement of said shutter to open position.

22. A combination as defined in claim 21 wherein said synchronizing switch means forms part of a flash circuit.

23. A combination as defined in claim 16, wherein said drive comprises a rotary main drive shaft and further comprising frame counter means operated by said main drive shaft in response to each opening of the shutter.

24. In a motion-picture camera, a combination comprising a rotary shutter; a drive for rotating said shutter, including an electric motor and a rotary main drive shaft which is rotated by said motor; blocking means movable between blocking and unblocking positions to respectively prevent and permit the operation of said drive; electromagnet means energizable to move said blocking means to said unblocking position and to complete the circuit of said motor; release means including selector means movable between a first position in which said drive is set for continuous operation so that the shutter admits scene light to motion-picture film at predetermined intervals and at least one additional position in which said drive is set for intermittent operations so that the shutter admits scene light for an individual exposure in response to each operation of said drive; trigger means movable from an inoperative to an operative position to thereby effect the energization of said electromagnet means by way of said release means; and frame counter means operated by said main drive shaft in response to each opening of the shutter, said frame counter means comprising means for arresting said drive upon completion of a predetermined number of exposures.

25. A combination as defined in claim 24, wherein said arresting means comprises a limit switch.

26. In a motion-picture camera, a combination comprising a rotary shutter; a drive, including an electric motor, for rotating said shutter; blocking means movable between blocking and unblocking positions to respectively prevent and permit the operation of said drive; electromagnet means energizable to move said blocking means to said unblocking position and to complete the circuit of said motor; release means including selector means movable between a first position in which said drive is set for continuous operation so that the shutter admits scene light to motion-picture film at predetermined intervals and at least one additional position in which said drive is set for intermittent operations so that the shutter admits scene light for an individual exposure in response to each operation of said drive; trigger means movable from an inoperative to an operative position to thereby effect the energization of said electromagnet means by way of said release means; adjustable diaphragm means; exposure meter means for adjusting said diaphragm means as a function of scene brightness; and correcting means for correcting the adjusting action of said exposure meter means in response to the movement of said selector means to said additional position.

27. A combination as defined in claim 26, wherein said exposure meter means comprises an electric light meter and said correcting means comprises resistor means connected in parallel with said light meter and switch means in series with said resistor means and arranged to close in response to movement of said selector means to additional position.

28. In a motion-picture camera, a combination comprising a rotary shutter; a drive, including an electric motor, for rotating said shutter; blocking means movable between blocking and unblocking positions to respectively prevent and permit the operation of said drive; electromagnet means energizable to move said blocking means to said unblocking position and to complete the circuit of said motor; release means including selector means movable between a first position in which said drive is set for continuous operation so that the shutter admits scene light to motion-picture film at predetermined intervals and at least one additional position in which said drive is set for intermittent operations so that the shutter admits scene light for an individual exposure in response to each operation of said drive; trigger means movable from an inoperative to an operative position to thereby effect the energization of said electromagnet means by way of said release means; said release means further comprising a master switch in circuit with said electromagnet means and arranged to close in response to movement of said trigger means to said operative position, said selector means comprising a second switch in series with said master switch and arranged to close in the first position of said selector means so that said electromagnet means is energized in direct response to movement of said trigger means to said operative position and remains energized while said trigger means dwells in said operative position.

29. In a motion-picture camera, a combination comprising a rotary shutter; a drive for rotating said shutter, including an electric motor, a main drive member which is rotated by said motor, and a locating member provided on said main drive member; blocking means movable between blocking and unblocking positions to respectively prevent and permit the operation of said drive; electromagnet means energizable to move said blocking means to said unblocking position and to complete the circuit of said motor, said blocking means comprising a blocking element which engages said locating member in the deenergized condition of said electromagnet means to thereby hold said main drive member in a predetermined angular position; release means including selector means movable between a first position in which said drive is set for continuous operation so that the shutter admits scene light to motion-picture film at predetermined intervals and at least one additional position in which said drive is set for intermittent operations so that the shutter admits scene light for an individual exposure in response to each operation of said drive, and a normally open control switch which is in circuit with said motor and is closed by said blocking element in response to the energization of said electromagnet means; and trigger means movable from an inoperative to an operative position to thereby effect the energization of said electromagnet means by way of said release means.

30. In a motion-picture camera, a combination comprising a rotary shutter; a drive for rotating said shutter, including an electric motor, a main drive member which is rotated by said motor and a locating member provided on said main drive member; blocking means movable between blocking and unblocking positions to respectively prevent and permit the operation of said drive; electromagnet means energizable to move said blocking means to said unblocking position and to complete the circuit of said motor, said blocking means comprising a blocking element which engages said locating member in the deenergized condition of said electromagnet means to thereby hold said main drive member in a predetermined angular position, said blocking element constituting a lever having a projection and said locating member comprising a wheel having an end face provided with a single notch which receives said projection in the deenergized condition of said electromagnet means when said main drive member reaches said predetermined position, said blocking means further comprising means for biasing said projection against said end face and said end face further having a slanting guide face which guides said projection into said notch upon deenergization of said electromagnet means; release means including selector means movable between a first position in which said drive is set for continuous operation so that the shutter admits scene light to motion picture film at predetermined intervals and at least one additional position in which said drive is set for intermittent operations so that the shutter admits scene light for an individual exposure in response to each operation of said drive; and trigger means movable from an inoperative to an operative position to thereby effect the energization of said electromagnet means by way of said release means.

31. In a motion-picture camera, a combination comprising a rotary shutter; a drive for rotating said shutter, including an electric motor, a main drive member which is rotated by said motor, and a locating member provided on said main drive member; blocking means movable between blocking and unblocking positions to respectively prevent and permit the operation of said drive; electromagnet means energizable to move said blocking means to said unblocking position and to complete the circuit of said motor, said blocking means comprising a blocking element which engages said locating member in the deenergized condition of said electromagnet means to thereby hold said main drive member in a predetermined angular position, said locating member comprising a flank cooperating with said blocking element to prevent the rotation of said main drive member in either direction in said predetermined angular position of said main drive member and in the deenergized condition of said electromagnet means; release means including selector means movable between a first position in which said drive is set for continuous operation so that the shutter admits scene light to motion-picture film at predetermined intervals and at least one additional position in which said drive is set for intermittent operations so that the shutter admits scene light for an individual exposure in response to each operation of said drive; and trigger means movable from an inoperative to an operative position to thereby effect the energization of said electromagnet means by way of said release means.

32. In a motion-picture camera, a combination comprising a rotary shutter; a drive, including an electric motor, for rotating said shutter; blocking means movable between blocking and unblocking positions to respectively prevent and permit the operation of said drive; electromagnet means energizable to move said blocking means to said unblocking position and to complete the circuit of said motor; release means including selector means movable between a first position in which said drive is set for continuous operation so that the shutter admits scene light to motion-picture film at predetermined intervals and at least one additional position in which said drive is set for intermittent operations so that the shutter admits scene light for an individual exposure in response to each operation of said drive; trigger means movable from an inoperative to an operative position to thereby effect the energization of said electromagnet means by way of said release means, said release means comprising a normally open master switch which is closed in response to the movement of said trigger means to said operative position to thereby at least initiate the energization of said electromagnet means; an internally threaded socket for attachment of auxiliary trigger means which is adapted to close said master switch; a second socket having electric terminals in parallel with said master switch; and second auxiliary trigger means comprising trigger switch means movable to a closed position, said second auxiliary trigger means being connectable with said second socket to thereby permit electric current to bypass said master switch on closing of said trigger switch means.

33. In a motion-picture camera, a combination comprising a rotary shutter; a drive for rotating said shutter, including an electric motor and a rotary main drive shaft rotated by said motor; blocking means movable between blocking and unblocking positions to respectively prevent and permit the operation of said drive; electromagnet means energizable to move said blocking means to said unblocking position and to complete the circuit of said motor; release means including selector means movable between a first position in which said drive is set for continuous operation so that the shutter admits scene light to motion-picture film at predetermined intervals and at least one additional position in which said drive is set for intermittent operations so that the shutter admits scene light for an individual exposure in response to each operation of said drive; trigger means movable from an inoperative to an operative position to thereby effect the energization of said electromagnet means by way of said release means; and frame counter means operated by said main drive shaft in response to each opening of said shutter, said frame counter means comprising a normally open electric switch which is closed by said main drive shaft during each revolution of said main drive shaft and while said main drive shaft assumes a predetermined angular position.